Sept. 10, 1946.  R. MONTGOMERY ET AL  2,407,614
STRUCTURE FOR SUPPORTING FUEL TANK IN AIRCRAFT WINGS
Filed July 3, 1943  5 Sheets-Sheet 1

INVENTORS.
Robert Montgomery
George W. Schane
BY John P. Tarbox
ATTORNEY

Sept. 10, 1946.   R. MONTGOMERY ET AL   2,407,614
STRUCTURE FOR SUPPORTING FUEL TANK IN AIRCRAFT WINGS
Filed July 3, 1943   5 Sheets-Sheet 4
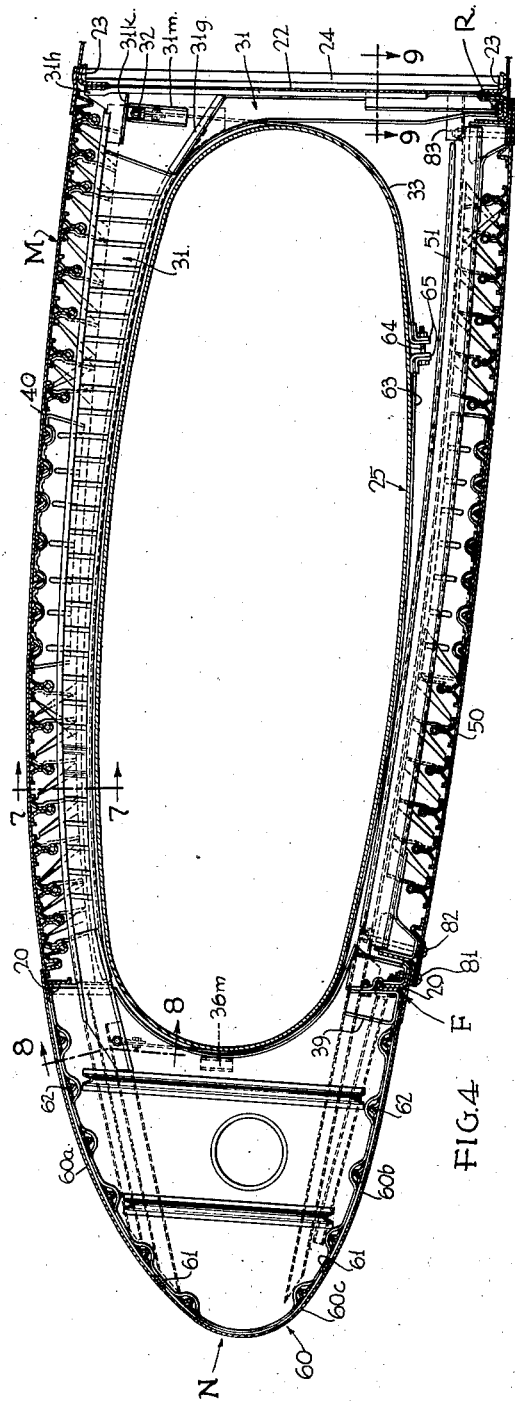
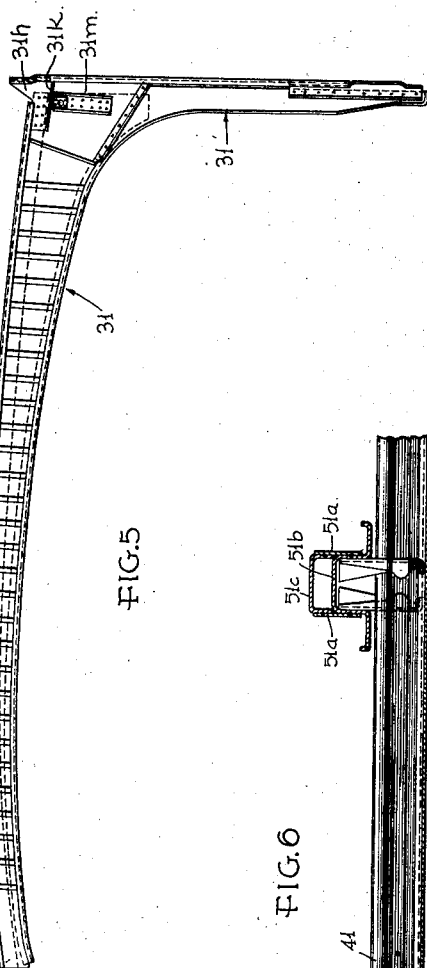
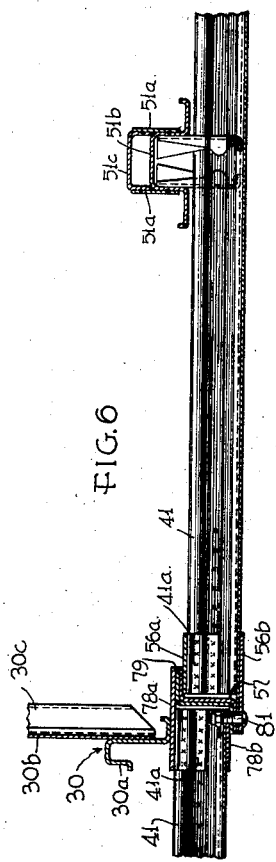
INVENTORS.
Robert Montgomery
George W. Schane.
BY John P. Tarbox
ATTORNEY

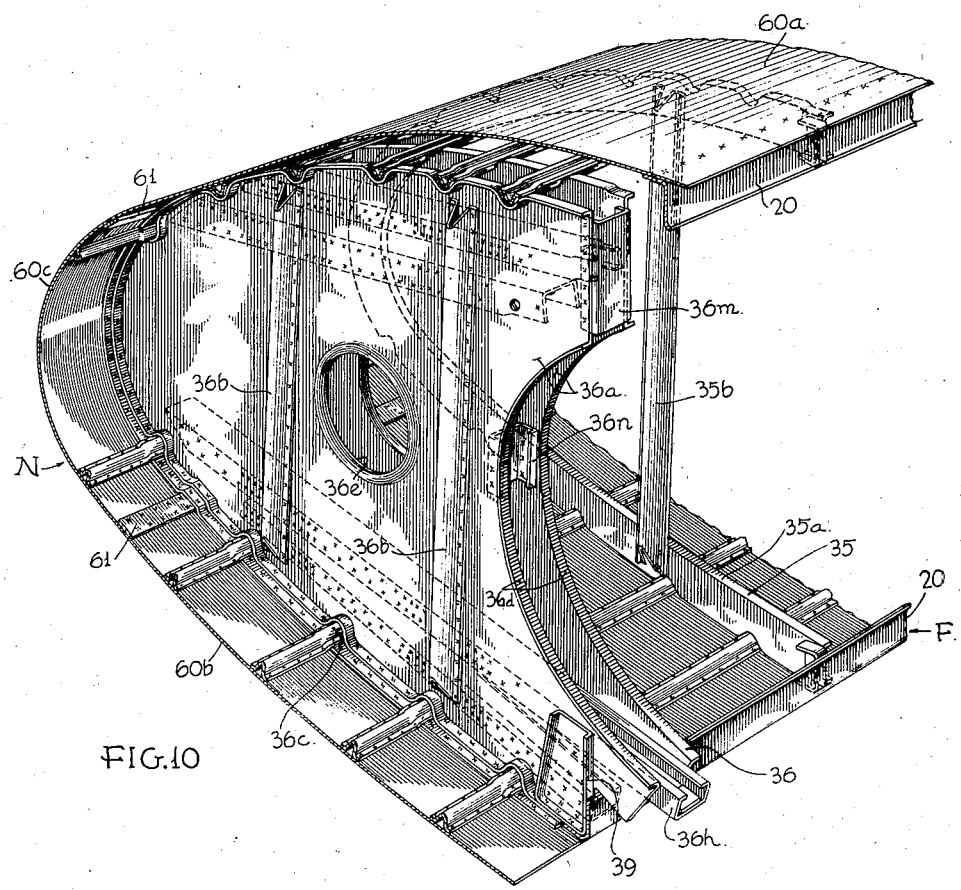

Patented Sept. 10, 1946

2,407,614

UNITED STATES PATENT OFFICE 2,407,614

STRUCTURE FOR SUPPORTING FUEL TANKS IN AIRCRAFT WINGS

Robert Montgomery and George W. Schane, Philadelphia, Pa., assignors to The Budd Company, Philadelphia, Pa., a corporation of Pennsylvania Application July 3, 1943, Serial No. 493,378

7 Claims. (Cl. 244—123)

This invention relates to aircraft structures, particularly to the wing structure of an airplane in the region of a removable fuel tank, and has for an object the provision of improvements in this art.

One of the particular objects of the invention is to provide a sturdy mounting for a fuel tank of large capacity in the wing of an aircraft.

Another object is to provide a removable fuel tank.

Another object is to reinforce the wing structure to compensate for the omission of usual structural members in the space occupied by the tank.

Another object is to provide a strong frame for the opening through which the tank passes during insertion and removal.

Another object is to provide a rigid closure for the opening and to firmly anchor the closure in the opening so that it acts as an effectual structural unit with the fixed structure.

Another object is to provide nose section structure which effectively substitutes for interchord struts in the nose or leading edge of the wing.

Another object is to provide ribs which furnish a convenient and secure anchorage for tank-supporting means.

Another object is to effectively transfer skin blanket loads across the tank region.

The enumerated and other objects of the invention will be apparent from the following description of an exemplary embodiment of the invention, reference being made to the accompanying drawings thereof, wherein:

Fig. 4 is a similar vertical chordwise section, also taken on the section line 3—4 of Fig. 1, but showing the tank and door in final assembly position;

Fig. 5 is a side elevation of a main-section rib element removed from the Fig. 4 assembly to show its structure alone;

Fig. 6 is a partial enlarged vertical spanwise section of the lower skin blanket at the door and frame joint, the view being taken on the line 6—6 of Fig. 2;

Fig. 7 is a partial enlarged vertical spanwise section of the upper skin blanket and main-section rib, the view being taken on the line 7—7 of Fig. 4;

Fig. 8 is a partial enlarged vertical spanwise section of the upper skin blanket and nose rib, the view being taken on the line 8—8 of Fig. 4;

Fig. 9 is a partial enlarged horizontal section through the rear spar and the adjacent portion of the main-section rib, the view being taken on the line 9—9 of Fig. 4; and Fig. 10 is a sectional perspective view of the nose section, the view being taken in approximately the same region as Fig. 3.

Figure 1:
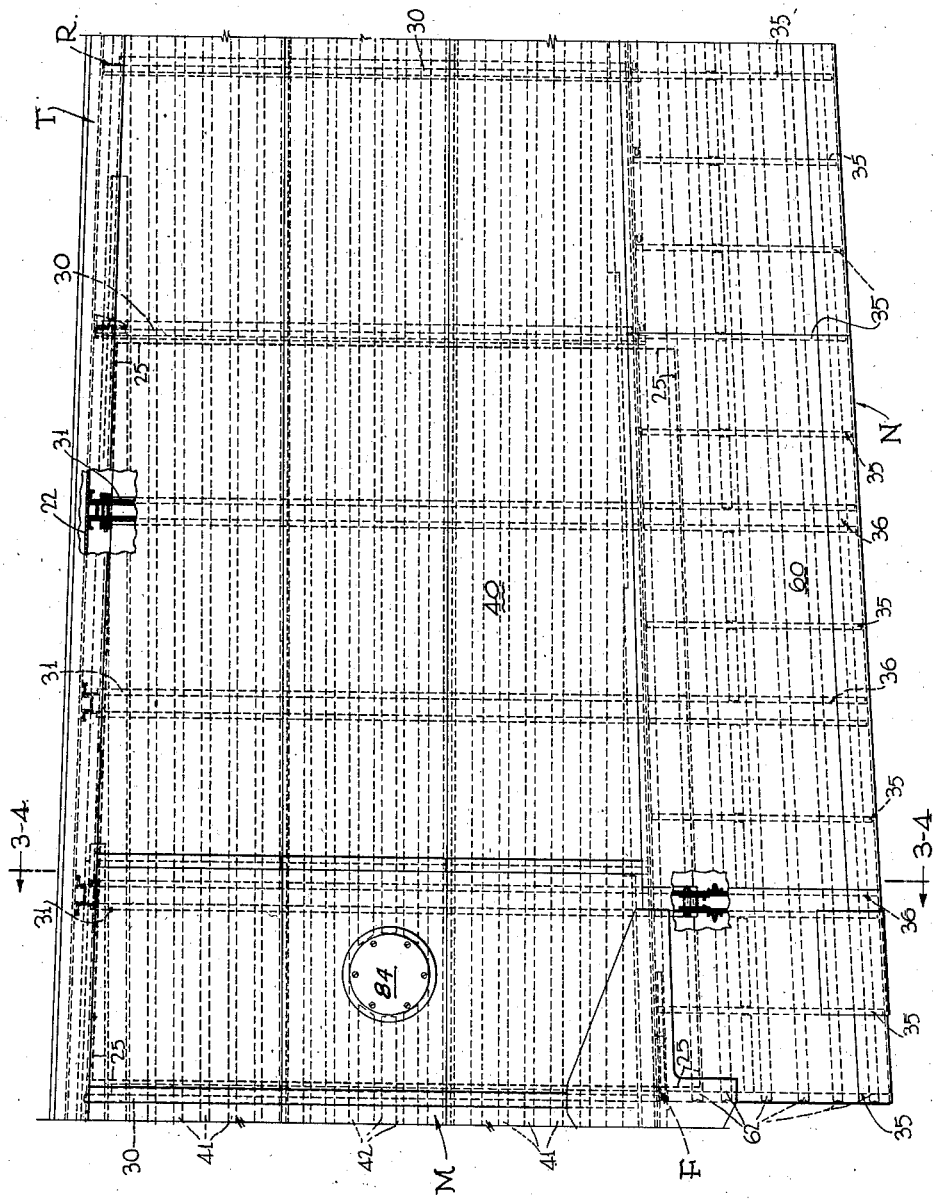
Fig. 1 is a top plan view of the nose and center sections of an airplane wing in the tank region.

The wing in which the tank is mounted comprises a nose or leading edge section N, a main or central section M, and a trailing section T. Only a very small part of the trailing section is shown herein. The main section lies between a front spar-like structure F and a rear spar R. Strictly speaking, the entire nose section constitutes the front spar but the chord-strut structure which exists at the usual front spar location may be referred to as a spar-like formation. The front spar-like structure is comprised of upper and lower spanwise extending L-section chords 20 and inter-spar struts (not shown but located between the chords at points other than the tank region, which is herein shown). The struts are not shown because the front end of the tank 25 extends through the line where the struts would be located, and other structure is provided in place of the omitted struts. The rear spar R includes a web 22, upper and lower L-chords 23, and vertical stiffener struts 24.

The wing, in addition to the spars F and R, includes (Figs. 1 and 2) other frame elements in the form of main-section ribs 30 and aligned nose section ribs 35. A small part of one of the main-section ribs 30 is shown in Fig. 6. It comprises Z-channel section cap strips or chords 30a, a complete web 30b, and stiffening struts 30c. The wing includes an upper cover or skin blanket 40, a lower cover or skin blanket 50, and a nose cover or skin blanket 60.

The nose blanket 60 is shown to be made up of an upper portion 60a, a lower portion 60b, and a front closure portion 60c. The skin portions are connected by splice strips 61. In addition to the skin sheets proper, the nose blankets 60a and 60b comprise through-running stringers 62.

The main section skin blankets 40, 50, besides the skin sheets proper, comprise Y-bulb stringers 41 toward the front and rear edges, hat-shaped channel-flanged stringers 42 in the middle, and heavier hat-shaped border stringers 43 at the extreme front and rear edges. In the regions of the Y-bulb stringers 41 the skin blankets are provided with clips 44 for adjustable connection to the ribs; and in the region of the hat-shaped stringers 42 the blankets are provided with flanged clip strips 45 for adjustable connection to the ribs.

In the tank region the structure is considerably altered, though the general representation of parts remains the same as in typical portions of the wing. Thus there are main ribs, but they are made heavier, of different shape, and divided differently; there are nose section ribs, but they are made heavier, of double webs, interconnected and reinforced, and recessed on the rear end to fit the front end of the tank; and the front spar-like formation is present only in the form of the upper and lower chords which are connected at spaced points by the nose ribs instead of by the typical inter-chord struts. A portion of the lower skin blanket is omitted to form an opening in sufficient size to pass the tank therethrough. This opening is heavily reinforced around its marginal edges. And a strongly constructed closure or door is provided to fill the opening and form a rigid continuation of the skin blanket and ribs across the opening. Specifically the construction is as follows:

Referring to Figs. 3, 4, 5, 7, and 9, between the rear spar R and the upper chord 20 of the front spar F at every rib station there is disposed and secured an L-shaped rib-strut member 31. This is a double-webbed member comprising the parallel plate webs 31a, outer web-connecting exteriorly-flanged channel members 31b (horizontal or rib) and 31c (vertical or strut), an inner web-connecting channel member 31d for the upper long or rib L-arm of the rib-strut, transverse stiffening elements 31e for the upper long or rib L-arm, nested angle-section reinforcing elements 31f for the vertical short L-arm near the lower end, and inclined stiffeners 31g in the crotch of the L. The L-shaped rib strut 31 is made widest in the crotch and diminishes toward the ends in cantilever fashion and interiorly is curved to fit the top and the upper portion of one end of the tank 25. As shown in Fig. 9, the flanges of the channel-shaped vertical or strut member 31c are welded to the web 22 of the rear spar, the nesting elements 31f also being welded in where present, and one flange of the spar stiffening strut 24 also being welded in where present. The outer corner of the L-shaped member 31 is provided with an upward projection 31h to connect with the upper chord 23 of the rear spar and flanged reinforcing plates 31k are welded to the webs 31a here. Also in the corner, flanged reinforcing cleats 31m are welded to the sides of the webs at a through-hole for a bolt 32 which anchors a tank-securing strap 33. The long arm of the rib-strut member 31, that is the rib portion thereof, is connected to the upper skin blanket as usual for the typical ribs, by the clips 44 and the flanged strips 45. This is shown in Fig. 7.

A typical nose rib 35 is shown in Fig. 10. It consists of a skeletonized flanged web 35a and one or more connecting struts 35b. The rib shown here is an intermediate or secondary nose rib, the typical nose ribs which fall in alignment with the typical main section ribs 30 being somewhat heavier; but it serves to show the general character of the typical ribs.

The aligned ribs 36 of the nose section comprise a pair of parallel flanged webs 36a and stiffening struts 36b. The outer flanged edges are notched, as at 36c, to receive the through-running stringers 62. The inner flanged edges are arcuately recessed, as at 36d to fit the front end of the tank 25. Flanged lightening holes 36e are provided in the webs. The webs are connected in box-like fashion near the upper edge by two channel-shaped bars 36f, 36g and near the lower edge by two channel-shaped bars 36h, 36k. At the upper projecting ends the webs are further connected by a terminal channel-shaped spacer 36m which at the front edge is welded to the upper spar chord 20. A similar channel-shaped spacer 36n is welded between the webs near the mid-height but disposed with the open side outward. A bolt 37 passing through a hole in the webs 36a and the bar 36g serves as anchorage for a tank supporting strap 38. Flanged clips 39 attach the webs 36a to the lower spar chord 20. The lower ends of the webs extend beyond the spar chord 20, as does also the end of the bar 36h, to partly underlie the tank 25 and to serve as anchorage for the closure for the lower skin blanket opening. The opening is designated as 70 and the closure or door as 80.

The forward ends of the rib-strut webs 31a, or splicers thereof as shown straddle and are welded to the nose rib webs 36a.

A third strap member 63 fills the space between the strap members 33 and 38 and the straps are tightened on the tank by clamp bolts 64 secured between projecting spaced lugs 65 on the straps.

The bottom opening 70 is suitably reinforced around its edges. At the front edge (Fig. 3) an L-shaped chord 71 is secured by welding and also by bolts 72 to the lower spar chord 20. At the nose ribs opposite the clips 39 other clips 73 are provided and the bolts 72 extend through the flanges of both clips 39 and 73 as well as the chords 20 and 71. Above the chords, the clips 39 and 73 are secured together through their flanges by bolts 74. An outer plate 75 is welded across the outer flanges of the chords 20 and 71.

At the rear edge of the opening an L-shaped chord 76 is welded to the lower chord 23 of the rear spar and a marginal plate 77 is welded to the outer flanges of the chords 23 and 76. The lower end of the strut portion of the rib-strut member 31 is welded in with the chords 23 and 76 here.

At the ends (Fig. 6) the stringers 41, 42 are reinforced by embracing end members 41a, interior projecting plates 78a, outer plates 78b, and Z-section chords 79 welded through their flanges to the plates 78a and 78b respectively.

The closure or door 80 comprises a section of the lower skin blanket 50, including Y-bulb stringers 41, middle hat-shaped stringers 42, marginal hat-shaped stringers 43, rib chord elements 51, connecting clips 44, and clip strips 45.

At the front and rear edges (Fig. 3) the door is reinforced by L-shaped chords 52 and outer flat plates 53. Flanged end clips 54 are welded to the rib elements 51, to the stringers 43, to the chords 52, and to the skin and the flat plates 53.

At the ends (Fig. 6) the edge reinforcement of the door is similar to that at the edge of the opening. Thus there are stringer embracing end members 41a, inner plates 56a, outer projecting plates 56b, and Z-sectioned chords 57 welded through their flanges to the plates 56a, 56b.

The rib chord elements (Fig. 6) comprise the spaced parallel side webs 51a, outer flanged channels 51b, and inner channel member 51c.

As shown in Figs. 4 and 6, the door is secured by short bolts 81 which pass through the outer projecting flanges of the nested marginal chord members, and long bolts 82 which pass through the marginal plates of the door and the projecting end of the bar members 36h (at the front edge) and inserted anchorage clips 83 (at the rear edge). The short bolts 81 are located at short intervals entirely around the door and the long bolts 82 are located at the ribs.

Figure 2:
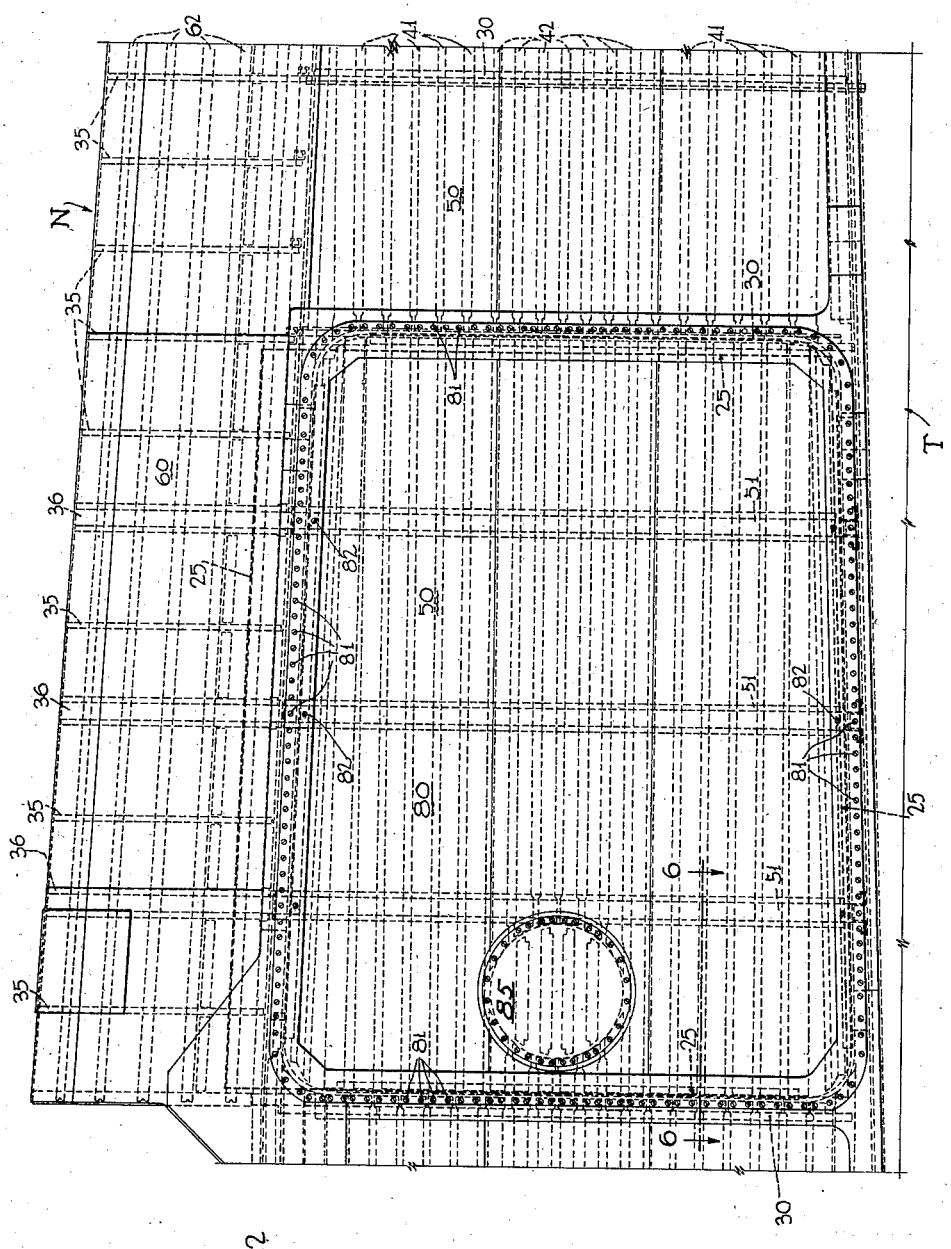
Fig. 2 is a corresponding bottom plan view.

As shown in Fig. 1, a filling opening, closed by a removable cap 84, is provided in the top of the wing; and, as shown in Fig. 2, a sump opening, closed by a removable cap 85 is provided in the bottom of the wing.

Figure 3:
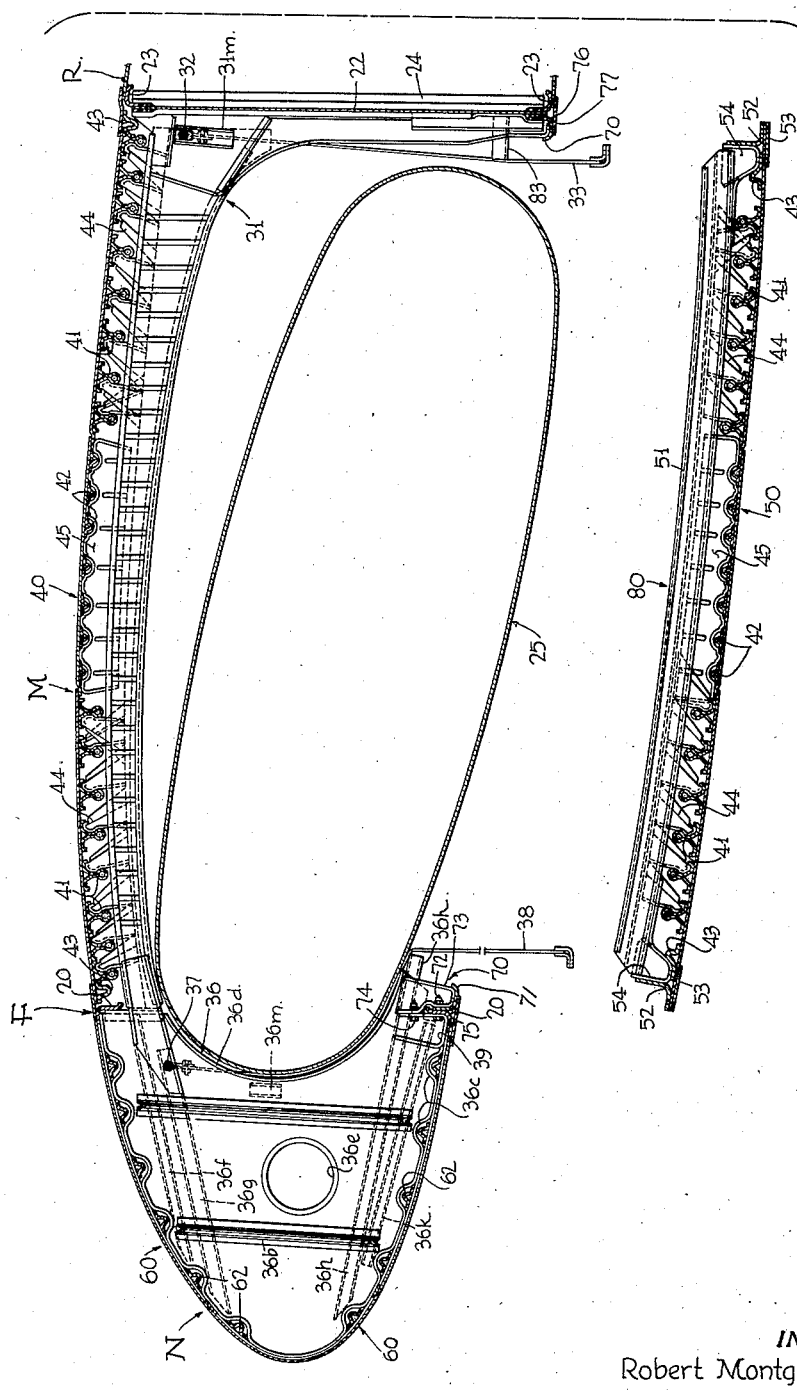
Fig. 3 is a vertical chordwise section through the wing structure with the closure or door removed and the tank in process of being inserted, the view being taken on the line 3—4 of Fig. 1.

As shown in Fig. 3, the tank 25 is inserted by pushing its front end upward and forward over the projecting parts until it seats in the arcuate recesses in the rear of the nose ribs. Then its rear end is pushed up to fit in the curved crotch of the rib-strut members. The tank straps 33, 38, and 63 are then connected by the bolts 64. Thereafter the closure 80 is placed in the opening and secured by the bolts 81, 82.

The rigid reinforced frame of the bottom opening, the rigid structure of the body and reinforced frame of the door and the numerous securing bolts insure that the wing across the opening is as strong as it is elsewhere. Also the double web ribs and the cantilever construction of the rib-struts insure that the interior frame here is as strong as it is in adjacent parts of the wing.

It is thus seen that the invention provides ample space within the wing for a tank; that the tank can be inserted and removed apart from the wing assembly; and that the wing in the tank region is substantially as strong as in adjacent regions.

While one embodiment of the invention has been described to illustrate the principles of the invention it is to be understood that the invention may have various embodiments within the limits of the prior art and the scope of the subjoined claims.

What is claimed is:

1. A wing construction for carrying a removable tank, comprising, in combination, a nose section, a main section, a front spar-like structure between said sections, a rear spar behind the main section, nose ribs recessed on the rear end adjacent the front spar structure, a tank fitting the recessed ends of the nose ribs, the front spar structure being open intermediate its edges in the tank region to permit the front end of the tank to extend therethrough, one or more L-shaped rib-strut members secured to the front of the rear spar and extending across the top of the main section and being connected to the nose ribs at the front end, an upper skin blanket secured to said rib-strut members, the rear end of the tank fitting a shaped portion on the inside edge of the rib-strut members, straps carried by said nose ribs and said rib-strut members supporting said tank, and a closure secured in a tank-passing opening in the lower part of the wing.

2. A wing construction for carrying a removable tank, comprising, in combination, a main section comprising rib elements and stringer-reinforced skin blankets secured thereto, the ribs and skin blanket of a portion of the bottom of the wing being removably fitted as a closure in a tank-passing opening, a nose section comprising nose ribs and a skin blanket thereon, said nose ribs and main section rib elements providing conjointly the interior opening for a tank, a tank secured therein, and means for securing said closure in said opening to form a rigid continuation of the wing structure across the opening, said opening extending through the wing surface on one side and being provided at the surface with angle-strip framing and flat outer border plates, said closure being provided with nesting angle-strip framing and flat outer border plates, and said securing means coacting with said angle strips and flat border plates.

3. A wing construction for carrying a removable tank, comprising, in combination, a main section comprising rib elements and stringer-reinforced skin blankets secured thereto, the ribs and skin blanket of a portion of the bottom of the wing being removably fitted as a closure in a tank-passing opening, a nose section comprising nose ribs and a skin blanket thereon, said nose ribs and main section rib elements providing conjointly the interior opening for a tank, a tank secured therein, and means for securing said closure in said opening to form a rigid continuation of the wing structure across the opening, said opening extending through the wing surface on one side and being provided at the surface on the front and rear edges with L-shaped frame members, on the ends with Z-shaped frame members, and on the outside with flat border strips, said closure being provided with nesting framing of corresponding shape and flat border plates, and said securing means coacting with said frame members and flat border plates.

4. A wing construction for carrying a removable tank, comprising, in combination, a main section comprising rib elements and stringer-reinforced skin blankets secured thereto, the ribs and skin blanket of a portion of the bottom of the wing being removably fitted as a closure in a tank-passing opening, a nose section comprising nose ribs and a skin blanket thereon, said nose ribs and main section rib elements providing conjointly the interior opening for a tank, a tank secured therein, and means for securing said closure in said opening to form a rigid continuation of the wing structure across the opening, said opening extending through the wing surface on one side and being provided at the surface framing, the ribs of the upper part of the main section being extended down at the rear end of the main section as struts to the lower part of the wing and being connected at the lower end to the frame members of the opening.

5. A wing construction for carrying a removable tank, comprising, in combination, a main section comprising rib elements and stringer-reinforced skin blankets secured thereto, the ribs and skin blanket of a portion of the bottom of the wing being removably fitted as a closure in a tank-passing opening, a nose section comprising nose ribs and a skin blanket thereon, said nose ribs and main section rib elements providing conjointly the interior opening for a tank, a tank secured therein, and means for securing said closure in said opening to form a rigid continuation of the wing structure across the opening, the tank securing means including suspension straps attached at their upper ends to the upper portion of said ribs.

6. A wing construction for carrying a removable tank, comprising, in combination, a main section comprising rib elements and stringer-reinforced skin blankets secured thereto, the ribs and skin blanket of a portion of the bottom of the wing being removably fitted as a closure in a tank-passing opening, a nose section comprising nose ribs and a skin blanket thereon, said nose ribs and main section rib elements providing conjointly the interior opening for a tank, a tank secured therein, and means for securing said closure in said opening to form a rigid continuation of the wing structure across the opening, said opening extending through the wing surface on one side and having its front and rear edges at the wing surface reinforced by angular spar chords, by angular frame members secured thereto, and by flat border strips on the outside, the opening having its end edges reinforced by stringer-embracing elements, by flat plates on the inside and outside, and by Z-section members whose flanges are secured to the flat plates, the closure being reinforced on its front and rear edges by angular frame members and by flat border strips on the outside, the closure having its end edges reinforced by stringer-embracing elements, by flat plates on the inside and outside, and by Z-section members whose flanges are secured to the flat plates, and said securing means coacting with said reinforcing means.

7. A wing construction comprising, in combination, an interior frame and upper and lower skin blankets, the blankets including spanwise extending stringers, the frame comprising front and rear spar means and rib elements secured thereto and having an interior tank space and the lower skin blanket having an opening, a tank disposed in said space, the tank being insertable through said opening, said opening having a reinforcing frame, and a closure for said opening forming a continuation of the skin blanket and having stringers forming a continuation of the skin blanket stringers and rib elements forming a continuation of said frame rib elements, and said closure having a reinforcing frame, the reinforcing frame at the ends of the opening and the closure comprising members embracing the ends of the stringers, outer and inner plates secured to opposite sides of the skin blanket, and Z-shaped members secured through their flanges to said plates.

ROBERT MONTGOMERY.
GEORGE W. SCHANE.